(12) United States Patent
Koyama

(10) Patent No.: US 6,409,408 B2
(45) Date of Patent: Jun. 25, 2002

(54) WRITING INSTRUMENT

(75) Inventor: Takao Koyama, Ashikaga (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/771,053

(22) Filed: Jan. 26, 2001

(30) Foreign Application Priority Data

Feb. 4, 2000 (JP) .......................................... 2000-027962

(51) Int. Cl.[7] .............................. B43K 5/00; A45D 34/00
(52) U.S. Cl. ......................................... 401/222; 401/209
(58) Field of Search ................................ 401/222, 209

(56) References Cited

U.S. PATENT DOCUMENTS 3,458,266 A * 7/1969 Douglas
5,944,438 A * 8/1999 Koyama et al. ............. 401/227
6,004,388 A * 12/1999 Osada ....................... 106/31.57

FOREIGN PATENT DOCUMENTS

JP     60-174652 A * 9/1985

* cited by examiner

Primary Examiner—Charles R. Eloshway
(74) Attorney, Agent, or Firm—Darby & Darby

(57) ABSTRACT

Provided is a free ink type writing instrument having an ink tank part for storing an ink, in which an amount of the ink can visually be observed. The free ink type writing instrument is characterized by that the whole or a part of an internal surface part in contact with the ink in the ink tank part has a smaller critical surface tension than a surface tension of the ink, and a contact angle between the ink and the whole or a part of the internal surface part in contact with the ink in the ink tank part is 30° or more at a temperature of 25° C.

11 Claims, 5 Drawing Sheets

RT-18XB

EXAMPLE 1

PP/RT-18XB

EXAMPLE 2

PP

EXAMPLE 3, 4

COMPARATIVE EXAMPLE 1

WRITING INSTRUMENT

BACKGROUND OF THE INVENTION

1. Field of the Invention

The present invention relates to a free ink type writing instrument in which an ink stored in an ink tank is fed directly to a pen tip or a writing instrument provided with an ink tank of a cartridge type for storing an ink, wherein visibility of an amount of the ink is excellent.

2. Description of the Related Art

In general, it can be given as one of the characteristics of a free ink type writing instrument that an amount of the ink can be observed (visibility). That is, in a free ink type writing instrument, an ink is filled in an ink tank which is a holder part, and the ink freely moves in the ink tank; and when the pen tip is turned downward, the amount of the ink can visually be confirmed through a visible part of the holder part.

At present, polypropylene which is excellent in transparency and solvent resistance and which has a good moldability is used for a holder part for a free ink type writing instrument since the visibility can be secured.

In the present situation, however, only a free ink type writing instrument using a water-based ink having a fluorescent color or a bright color such as a pen for underlining makes it possible to visually confirm relatively easily an amount of the ink, while there involved is a problem that when used are a water-based ink having a dark color such as black and blue and an oil-based ink containing an organic solvent as a main solvent, a free ink type writing instrument does not have sufficiently high visibility of the amount of the ink yet and has not reached a practical use level.

It has so far been known to provide a rib on an internal surface of an ink tank part to elevate visibility in order to solve these problems, but the effect thereof has not yet been satisfactory.

Further, there have so far been tried various devices such as using a fluororesin for an ink tank material, treating with fluorine or silicone oils in order to provide an internal surface with a low surface energy state (Japanese Patent Publication No. Sho 38-20913) and using the rib described above in combination with silicone oil treatment (Japanese Patent Application Laid-Open No. Hei 11-216987).

However, in such devices as described in these publications, it takes time until an ink is repelled and slides down (clear draining) from an internal surface of an ink tank, and the effect on visibility thereof is unsatisfactory; a tank material does not have sufficient transparency, so that the effect thereof is not sufficiently persistent; and moldability of the material is inferior to require complicated steps, so that there involved is a problem in terms of a cost. Thus, the existing state is that satisfactory solutions have not yet been proposed.

In light of the problems and the status quo of the conventional techniques described above, the present invention intends to solve the problems, and an object thereof is to provide a writing instrument which is excellent in visibility of an ink and has excellent persistency of the effect thereof.

SUMMARY OF THE INVENTION

Intensive researches conducted by the present inventors in order to solve the problems on the conventional techniques described above have resulted in finding that a writing instrument which meets the object described above can be obtained by specifying a critical surface tension of the whole or a part of an internal surface part in contact with an ink in an ink tank part and a contact angle between the ink and the whole or a part of the internal surface part in the ink tank part. Thus, the present invention has been completed.

That is, the present invention comprises the following items (1) to (5). (1) A free ink type writing instrument having an ink tank part for storing an ink, wherein the whole or a part of an internal surface part in contact with the ink in the ink tank part has a smaller critical surface tension than a surface tension of the ink, and a contact angle between the ink and the whole or a part of the internal surface part in contact with the ink in the ink tank part is 30° or more at a temperature of 25° C. (2) The writing instrument as described in the above item (1), wherein the whole of the member of the ink tank part or the whole or a part of the internal surface part of the ink tank part comprises polymethylpentene. (3) The writing instrument as described in the above item (1) or (2), wherein the ink has a surface tension of 50 mN/m or less at a temperature of 25°, and a contact angle between the ink and the internal surface part in contact with the ink in the ink tank part is 30° to 90° at a temperature of 25° C. (4) The writing instrument as described in any of the above items (1) to (3), wherein the ink has a viscosity of 1000 mPa's or less at a temperature of 25°. (5) The writing instrument as described in any of the above items (1) to (4), wherein a principal solvent of the ink comprises an organic solvent.

In the present invention, a "free ink type writing instrument" means a writing instrument which has an ink tank for directly storing an ink without absorbing in a sliver and in which installed is an ink reservoir (collector member) for temporarily reserving the ink pressed out from the ink tank when the air contained in the ink tank is expanded by a rise in the temperature so as to prevent the ink from blobbing from the pen tip or the air hole.

The "critical surface tension" specified in the present invention means a critical surface tension $\gamma_c$ represented by a value of $\gamma$ corresponding to $\cos \theta = 1$ on a straight line obtained by measuring contact angles $\theta$ of liquids on the surface of a solid which is hardly wet to water and plotting (Zisman plot) values of $\cos \theta$ against surface tensions $\gamma$ of the liquids.

According to the present invention, provided is a writing instrument which is excellent in visibility of an ink and persistency of the effect thereof and which is prevented from being subjected to surface treatment of the whole or a part of the ink tank and therefore can be produced at a low cost without complicated after-steps.

DESCRIPTION OF THE PREFERRED EMBODIMENTS

Figure 1:
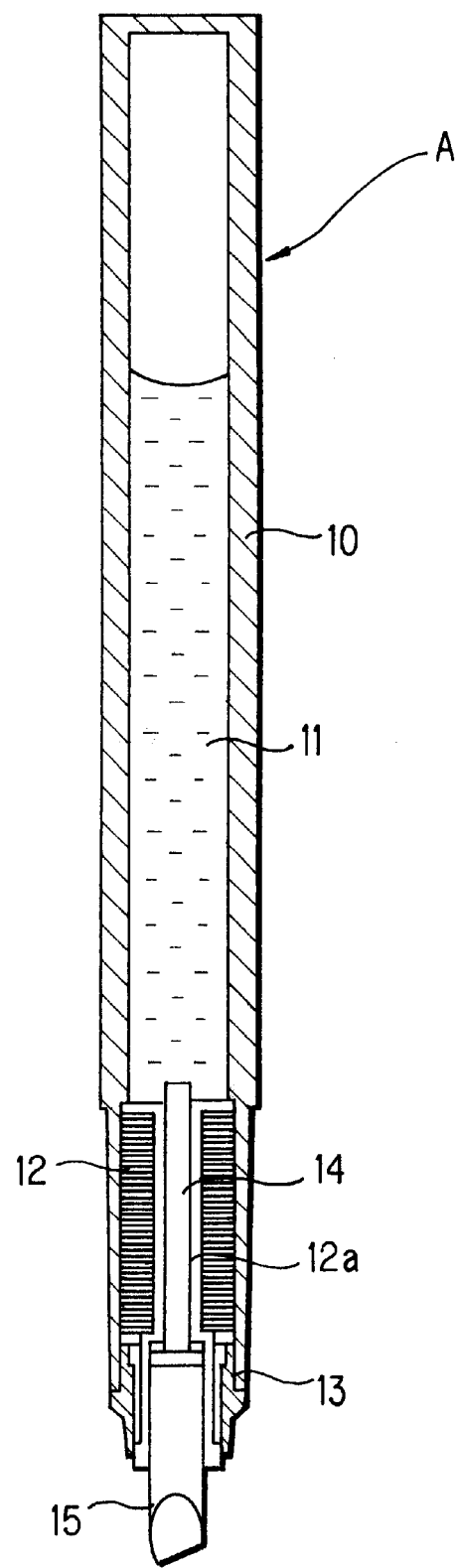
FIG. 1 is a cross section showing one example of specific embodiments in which the writing instrument of the present invention is applied to a marking pen.

The embodiments of the present invention shall be explained below in detail.

The writing instrument of the present invention is characterized by a free ink type writing instrument having an ink tank part for storing an ink, wherein the whole or a part of an internal surface part in contact with the ink in the ink tank part has a smaller critical surface tension than a surface tension of the ink, and a contact angle between the ink and the whole or a part of the internal surface part in contact with the ink in the ink tank part is 30° or more at a temperature of 25° C.

In the writing instrument of the present invention, used in order to elevate visibility of an amount of the ink is an ink having a surface tension ($\gamma$) which is controlled to be larger than a critical surface tension ($\gamma_c$) [$\gamma_c < \gamma$] of the whole of the member of the ink tank part, or the whole or a part of the internal surface part of the tank part, and a contact angle between the ink and the whole or a part of the internal surface part in the ink tank part in the present invention is set to 30° or more at a temperature of 25° C.

In the present invention, if an ink used has a surface tension of $\gamma_c > \gamma$ and the contact angle between the ink and the whole or a part of the internal surface part in the ink tank part is less than 30° at a temperature of 25° C., improvement in the visibility and the persistency of the effect thereof which are the effects of the present invention can not be maintained, and therefore they are not preferred.

In the writing instrument of the present invention, the member of the ink tank part shall not specifically be restricted as long as it is a member which has transmittance (transparency) of visible rays and in which a contact angle between the ink and the whole or a part of the internal surface part in the ink tank part becomes 30° or more, preferably 30 to 90° at a temperature of 25° C. It includes, for example, thermoplastic plastics having transparency and capable of being injection-molded. To be specific, given as the examples thereof are polypropylene, polyethylene, polyethylene terephthalate, polystyrene, polyetherimide, polycarbonate, polysulfone, acrylonitrile-styrene copolymers, butadiene-styrene-methyl methacrylate terpolymers, ethylene-vinyl chloride copolymers, ethylene-vinyl alcohol copolymers, polymethylpentene and polyethersulfone.

In the writing instrument of the present invention, the ink to be filled in the ink tank shall not specifically be restricted as long as it has a surface tension ($\gamma$) which is controlled to be larger than a critical surface tension ($\gamma_c$) [$\gamma_c < \gamma$] of the whole of the member of the ink tank part, or the whole or a part of the internal surface part of the tank part. Capable of being used are, for example, water-based inks or oil-based inks used for conventional writing instruments, which are prepared by dissolving or dispersing colorants comprising a dye and/or a pigment, resins, dispersants, surfactants and other additives for a writing instrument in water (purified water and ion-exchanged water) or a liquid obtained by mixing at least one of organic solvents.

The organic solvents include, for example, 1-methoxy-2-propanol, 1-ethoxy-2-propanol, benzyl alcohol, ethanol, ethylene glycol, carbitol, cellosolve, glycerin, diethylene glycol stearate, propylene glycol, propylene glycol monomethyl ether, 1-propanol, 2-propanol, 1-butanol, 2-butanol and t-butyl alcohol.

Additives which have so far been known such as a pH controlling agent, a preservative and a rust preventive can suitably be added as the other additives for a writing instrument.

The present invention is effective in both of water-based and oil-based inks, but particularly effective in an oil-based ink containing a principal solvent comprising an organic solvent and having a small surface tension.

The ink has a viscosity of 1000 mPa's or less, preferably 100 mPa's or less and more preferably 10 mPa's or less at 25° C.

If the ink has a viscosity exceeding 1000 mPa's, it is hard for the ink to move in the ink tank, and time which is required until the ink is repelled and slides down is elongated and deviated from a practical range. Thus, it becomes difficult to observe the amount of the ink, and therefore such a viscosity is not preferred.

In the writing instrument of the present invention, among the thermoplastic resins described above, polymethylpentene which has such excellent transparency that a transmission factor of visible rays is 90% or more and which has a small critical surface tension ($\gamma_c$) and good moldability is used for the whole of the ink tank member or the whole or a part of the internal surface of the tank.

Use of polymethylpentene having a small critical surface tension ($\gamma_c$) expands a range of a surface tension of an ink capable of being used and makes it easy to prepare various kinds of inks. Further, if a surface tension of the ink is controlled preferably to 24 mN/m or more, a contact angle between the ink and the whole or a part of the internal surface part in the ink tank part is controlled to 30° or more at a temperature of 25° C., and this makes it possible to readily mass-produce an ink tank part having excellent visibility of an amount of the ink by conventional plastic molding without carrying out after-processing such as surface treatment and providing a rib on the internal surface of the ink tank and therefore is preferred.

If the ink has a surface tension of less than 24 mN/m, the internal surface of the ink tank part has to comprise a fluororesin or has to be subjected to fluorine or silicone treatment in the case of a free ink type writing instrument. A fluororesin has problems on moldability, transparency and a cost, and fluorine or silicone treatment have problems on persistency of the effect, a treating step and a cost. Even if these devices work out well, since capillary force between fins of a collector member in a temporary reserving part is prescribed by a clearance between the fins and a surface tension of the ink, the capillary force between the fins is reduced when the surface tension of the ink is small, so that the ink can not be reserved. Accordingly, if the ink has a surface tension of less than 24 mN/m, the clearance has to be reduced, but this is difficult in relation to a problem of moldability and a temporary reserving volume.

Further, when the ink tank member is made of, for example, polypropylene, visibility of an amount of the ink which is the effect of the present invention, is not usually revealed if the ink does not have a surface tension of 30 mN/m or more.

In the present invention, the ink has preferably a surface tension of 50 mN/m or less, more preferably 24 to 50 mN/m at a temperature of 25° C., and a contact angle between the ink and the whole or a part of the internal surface part in the ink tank part is preferably 30° to 90° at a temperature of 25° C.

If the ink has a surface tension exceeding 50 mN/m, and the contact angle between the ink and the internal surface part in the ink tank part exceeds 90°, the ink stays in the state that it sticks to the internal surface part in the ink tank part because of a large surface tension of the ink itself and difficulty in wetting of the ink onto the internal surface part in the ink tank part, which results in bringing about the problem that the ink is inhibited from moving in the ink tank part.

As described above, the structure of the writing instrument in the present invention shall not specifically be restricted as long as in the free ink type writing instrument having an ink tank for storing an ink, the whole or a part of the internal surface part in contact with the ink in the ink tank part has a smaller critical surface tension than a surface tension of the ink, and a contact angle between the ink and the whole or a part of the internal surface part in contact with the ink in the ink tank part is 30° or more at a temperature of 25° C. Various structures of free ink type writing instruments which have so far been used can be applied thereto. The embodiments of the writing instruments showing the specific structures of the present invention shall further be explained below with reference to the drawings.

FIG. 1 is a cross section showing one example of specific embodiments in which the free ink type writing instrument of the present invention is applied to a marking pen.

In the free ink type writing instrument A of the present embodiment, an ink 11 is, as shown in FIG. 1, filled in an ink tank part 10 which is a holder part. In the present embodiment, the whole of the member in the ink tank part 10 is composed of polymethylpentene having excellent transparency.

A numeral 12 in FIG. 1 is a collector member; a numeral 13 is a holder member; a numeral 14 is a feeder; and a numeral 15 is a pen feeder which is a pen tip. The ink 11 is derived from the ink tank 10 into the pen tip 15 via the feeder 14 having an ink passage which is disposed in a central hole 12a of the collector part 12.

In the writing instrument A of the present embodiment, the whole of the internal surface part in contact with the ink 11 in the ink tank part 10 has a smaller critical surface tension than a surface tension of the ink 11, and a contact angle between the ink 11 and the whole of the internal surface part in contact with the ink 11 in the ink tank part 10 is set to 30° or more, preferably 30 to 90° at a temperature of 25° C. Further, a surface tension of the ink is set to 50 mN/m or less, preferably 24 to 50 mN/m at a temperature of 25° C. This allows the ink 11 to be repelled from the internal surface of the ink tank and to slide down (clear draining) for a short time and causes visibility of an amount of the ink to be very excellent.

In this writing instrument A, only charging the ink tank 10 having the characteristics described above with the ink having the characteristics described above provides a free ink type writing instrument which is excellent in visibility of an amount of the ink. The intended free ink type writing instrument can be produced without passing through a conventional step for forming a rib shape in an ink tank part for the purpose of improving visibility of an amount of the ink, and therefore a free ink type writing instrument which is excellent in terms of productivity and a cost can be provided.

Figures 2A, 2B:
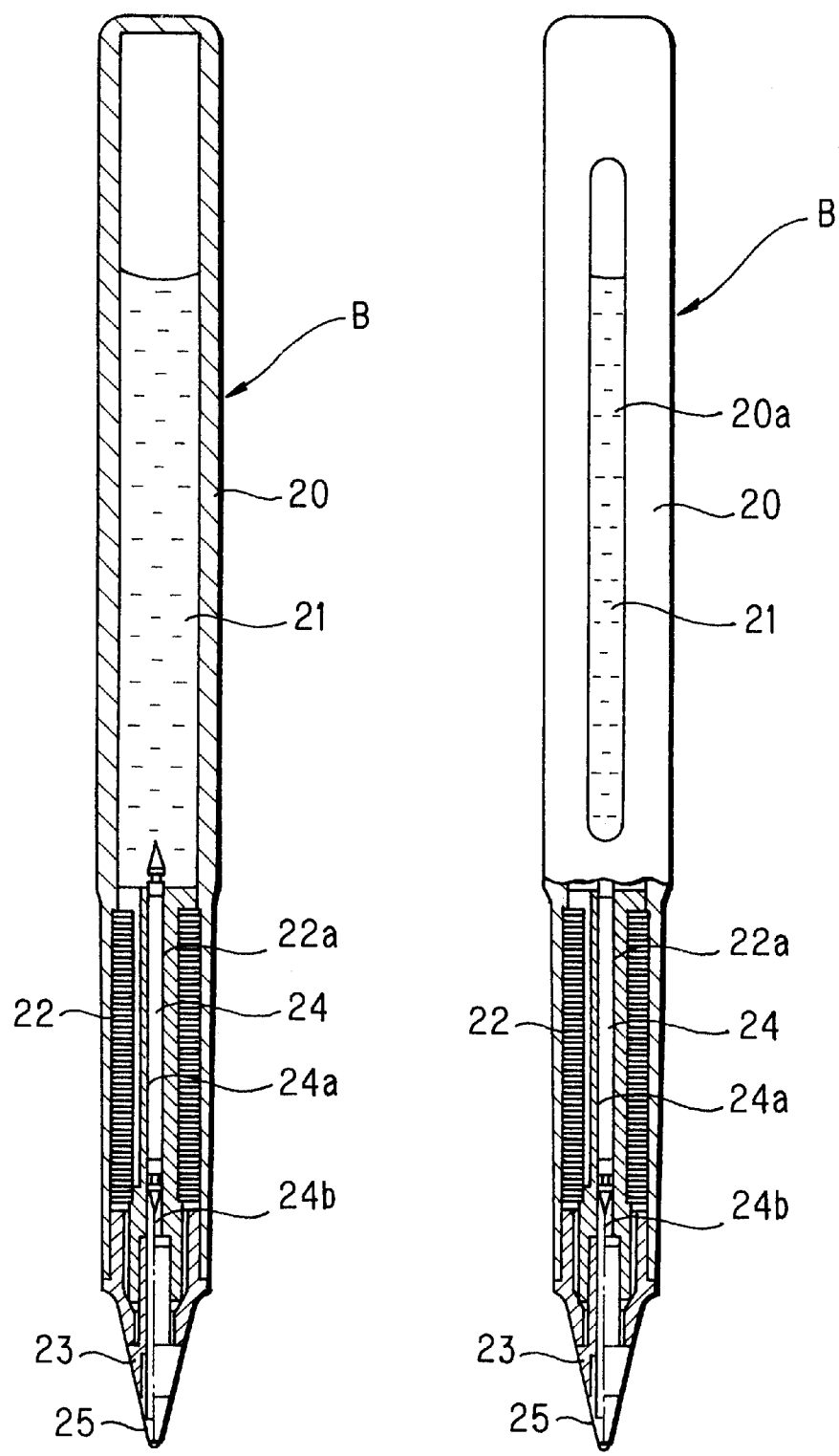
FIGS. 2 (a) and (b) are cross sections and partial cross sections showing one example of specific embodiments in which the writing instrument of the present is applied to a ball point pen.

FIGS. 2 (a) and (b) are explanatory drawings showing a specific embodiment in which the free ink type writing instrument is applied to a ball point pen.

In the free ink type writing instrument B of the present embodiment, an ink 21 is filled in an ink tank part 20 having a visible part 20a and, the whole of a member of the ink tank part 20 is composed of polymethylpentene having excellent transparency. The whole of an internal surface part in contact with the ink 21 in the ink tank part 20 has a smaller critical surface tension than a surface tension of the ink 21, and a contact angle between the ink 21 and the whole of the internal surface part in contact with the ink 21 in the ink tank part 20 is set to 30° or more, preferably 30 to 90° at a temperature of 25° C. Further, a surface tension of the ink is set to 50 mN/m or less, preferably 24 to 50 mN/m at a temperature of 25° C.

A coating film such as a coated film and a metal-deposited film is provided on a surface part of the ink tank 20 excluding the visible part 20a described above to form an opaque part from which the ink is invisible.

A numeral 22 in FIG. 2 is a collector member; a numeral 23 is a holder member; a numeral 24 is an ink feeder comprising a guiding feeder 24a and a center feeder 24b; and a numeral 25 is a pen tip comprising a ball point pen tip. The ink 21 is derived from the ink tank 20 into the pen tip 25 via the feeder 24 which comprises the guiding feeder 24a and the center feeder 24b and has an ink passage and which is disposed in a central hole 22a of the collector part 22.

In the writing instrument B of the present embodiment, a visible part 20a (another visible part having the same structure on a back face side which is a reverse side) is formed on a part of the ink tank 20. Even if this visible part 20a (transparent window) is a part of the ink tank 20, the relation of the critical surface tension described above to a surface tension of the ink and the relation of the contact angle between the ink and a part of an internal surface part which is the visible part of the ink tank do not allow the ink to remain on a surface of the visible part 20a and cause the ink to be repelled from the internal surface of the ink tank and to slide down for a short time. Accordingly, obtained is the writing instrument which is very excellent in visibility of an amount of the ink.

In particular, when a visible part is formed in a part of an ink tank, the ink-repelling property thereof is inferior even if the ink tank is provided with a rib shape in a conventional free ink type writing instrument filled with an ink having a dark color such as black and blue, and the visibility thereof is still problematic. In the writing instrument of the present invention, however, ink components do not remain on the surface of the visible part 20a even in the free ink type writing instrument filled with an ink having a dark color such as black and blue, and the ink is repelled for a short time. Accordingly, obtained is the writing instrument which is very excellent in visibility of an amount of the ink.

Figure 3:
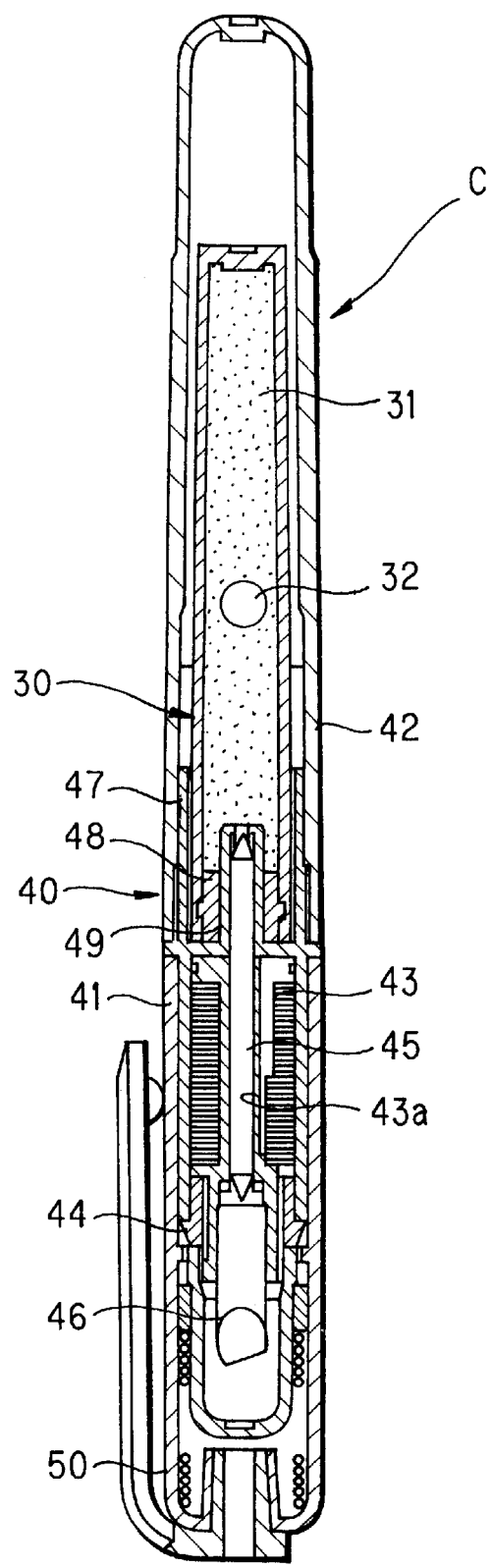
FIG. 3 is a cross section showing one example of specific embodiments in which the writing instrument of the present invention is applied to a marking pen equipped with an ink tank of a cartridge type.

FIG. 3 is an explanatory drawing for explaining a specific embodiment of a writing instrument (marking pen) equipped with an ink tank of a cartridge type.

As shown in FIG. 3, the cartridge type writing instrument C of the present embodiment is composed of an ink tank 30 of a cartridge type, a writing instrument main body 40 and a cap body 50.

The whole of the ink tank 30 of a cartridge type is composed of polymethylpentene, and an ink 31 and a sealing ball 32 are present in the ink tank 30.

The writing instrument main body 40 has a front holder 41 and a rear holder 42, and the front holder 41 is provided therein with a collector member 43, a holder member 44, a feeder 45 and a pen feeder 46 which is a pen tip. The rear holder 42 is provided therein with a cylinder part 47 to be integrated with the front holder 41, a seal-receiving part 48 and a cylindrical projection 49. All of the front holder 41, the cylinder part 47 and the rear holder 42 are composed of polycarbonate.

The ink 31 is derived from the ink tank 30 of a cartridge type into the pen feeder 46 via the feeder 45 having an ink passage which is disposed in a central hole 43a of the collector part 43.

In the writing instrument C of the present embodiment, the whole of an internal surface part in contact with the ink in the ink tank 30 of a cartridge type has a smaller critical surface tension than a surface tension of the ink 31, and a contact angle between the ink and the whole of the internal surface part in contact with the ink 31 in the ink tank part 30 is set to 30° or more, preferably 30 to 90° at a temperature of 25° C. Further, a surface tension of the ink is set to 50 mN/m or less, preferably 24 to 50 mN/m at a temperature of 25° C. This allows the ink 31 to be repelled from the internal surface of the ink tank and to slide down for a short time and causes visibility of an amount of the ink to be very excellent. In the case of the writing instrument C of the present embodiment, the amount of the ink in the ink tank 30 of a cartridge type is visually confirmed mainly via the rear holder 42 having transparency in the writing instrument main body.

Figure 4A:
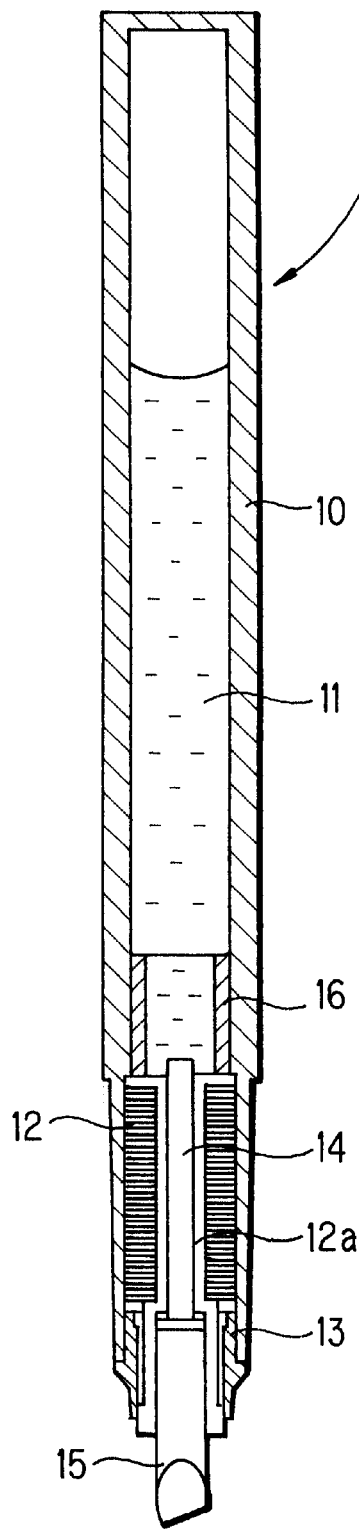
FIGS. 4 (a) and (b) are cross sections and partial cross sections showing other examples of specific embodiments in which the writing instrument of the present is applied to a marking pen.
Figure 4B:
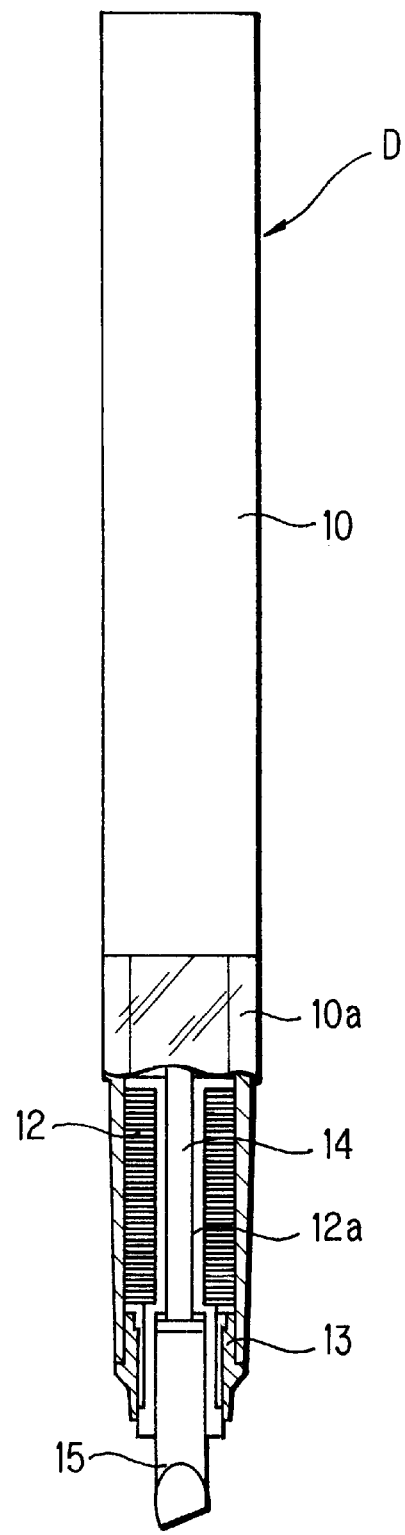

FIGS. 4 (a) and (b) are another example of specific embodiments in which the free ink type writing instrument of the present invention is applied to a marking pen. The same members as in the writing instrument A shown in FIG. 1 are shown by the same symbolss, and therefore explanations thereof shall be omitted.

The writing instrument D of the present embodiment is different from the writing instrument A shown in FIG. 1 having the ink tank part the whole of which is composed of polymethylpentene having excellent transparency in the following points; a member of an ink tank part 10 is composed of polypropylene having transparency; a cylindrical transparent body 16 which is composed of polymethylpentene having excellent transparency is installed on an internal circumference of the ink tank part 10 so that it comes in contact with an end face of a collector member 12; and a coating film such as a coated film and a metal-deposited film is provided on a surface part of the ink tank part 10 excluding a visible part (transparent window) 10a of the ink tank part 10 to form an opaque part from which the ink is invisible.

In the writing instrument D of the present embodiment, an internal surface part of the transparent body 16 that is provided in a part of the ink tank part 10, which comes to contact with the ink 11, has a smaller critical surface tension than a surface tension of the ink 11, and a contact angle between the ink 11 and the internal surface part of the transparent body 16 in contact with the ink 11 is set to 30° or more, preferably 30 to 90° at a temperature of 25° C. Further, a surface tension of the ink is set to 50 mN/m or less, preferably 24 to 50 mN/m at a temperature of 25° C. This allows the ink 11 to be repelled from the internal surface of the transparent body 16 and to slide down for a short time and causes visibility of an amount of the ink to be very excellent. In the case of the writing instrument D of the present embodiment, the amount of the ink in the ink tank part 10, which is to be finally consumed, is visually confirmed via the visible part 10a in the writing instrument body 10.

The free ink type writing instrument of the present invention shall not be restricted to the marking pen and the ball point pen of the embodiments A, B and D described above and can be applied as well to a brush pen, a fountain pen and a felt tip pen. The writing instrument of the embodiment C described above which is provided with the ink tank of a cartridge type can be applied to, for example, a felt tip pen, a ball point pen and a fountain pen which are provided with an ink tank of a cartridge type. Further, it can be applied as well to an applicator prepared by substituting a coater and a cosmetic liquid such as a manicure liquid or a liquid drug having a pharmacological effect, for the pen tip and the ink respectively.

In the embodiments A to D described above, polymethylpentene is used, but as described above, polypropylene, polyethylene, polyethylene terephthalate and polycarbonate may be used.

The writing instrument of the present invention is constituted as described above. In the writing instrument of a free ink type having an ink tank for storing an ink, a critical surface tension of the whole or a part of the internal surface part in contact with the ink in the ink tank part is smaller than a surface tension of the ink, and a contact angle between the ink and the whole or a part of the internal surface part in contact with the ink in the ink tank part is set to 30° or more at a temperature of 25° C., whereby the ink is readily repelled from the internal surface in the ink tank part and slides down for a short time, so that it is very excellent in visibility of an amount of the ink.

EXAMPLES

Figure 5A:
FIGS. 5 (a), (b) and (c) are schematic explanatory drawings each showing in order the writing instruments used in Examples 1, 2 and Examples 3, 4, Comparative Example 1 respectively.
Figure 5B:
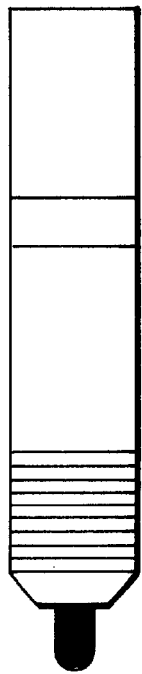
Figure 5C:
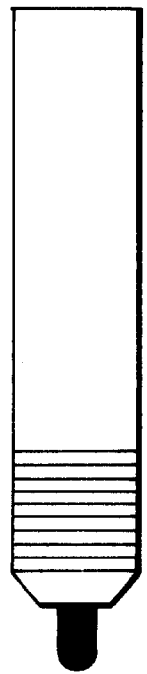

Next, the present invention shall be explained in further details with reference to examples and comparative examples, but the present invention shall by no means be restricted to the following examples. FIG. 5 (a), (b) and (c) are schematic explanatory drawings each showing the writing instruments used in Examples 1, 2 and Examples 3, 4, Comparative Example 1 respectively.

Example 1

A marking pen shown in FIG. 1 and FIG. 5 (a) was prepared. That is, polymethylpentene (TPX RT-18XB, manufactured by Mitsui Chemicals Inc.) was used and molded to obtain an ink tank part (holder) having an outer diameter of 10 mm, an inner diameter of 8 mm and a length of 80 mm.

The critical surface tension of polymethylpentene obtained by Zisman-plot was 23.3 mN/m (25° C.).

The ink tank part was charged with an ink having the following composition.

|  | (parts by weight) |
|---|---|
| Propylene glycol monomethyl ether | 79.95 |
| Ketone resin (Hilac 110H, manufactured by Hitachi Chemical Co., Ltd.) | 10 |
| Dye (Valifast Black #1308, manufactured by Orient Chemical Ind., Ltd.) | 5 |
| Benzyl alcohol | 5 |
| Surfactant (KP361, manufactured by Shin-Etsu Chemical Co., Ltd.) | 0.05 |

A black ink having the composition described above was charged into the ink tank to such an extent that the whole volume of the tank was filled by about 30%.

The following ink physical properties were obtained. Surface tension: 25 mN/m (25° C.) Viscosity: 5 mPa's (25° C.) Contact angle: 32.8 degree (to polymethylpentene; 25° C.)

Example 2

Polypropylene (J229 E manufactured by Mitsui Chemicals Inc.) was used to mold an ink tank part (holder) having the same dimension as in Example 1, and telescopically inserted into a central part of the ink tank was a transparent body prepared by molding polymethylpentene into a ring shape (cylinder) having an outer diameter of 8 mm, an inner diameter of 7.5 mm and a length of 10 mm (refer to FIG. 4 (a) and FIG. 5 (b)), and thus a part of an internal surface of the ink tank part was formed from polymethylpentene (transparent body). The writing instrument of Example 2 is a little different from the writing instrument shown in FIG. 4 (a) in the point that the transparent body 16 is disposed in the middle part (this part is a transparent window and a visible part).

The ink tank part was charged with an ink having the following composition.

|  | (parts by weight) |
|---|---|
| Propylene glycol monomethyl ether | 80 |
| Ketone resin (Hilac 110H, manufactured by Hitachi Chemical Co., Ltd.) | 10 |
| Dye (Valifast Black #1308, manufactured by Orient Chemical Ind., Ltd.) | 5 |
| Benzyl alcohol | 5 |

A black ink having the composition described above was charged into the ink tank to such an extent that the whole volume of the tank was filled by about 30%.

The following ink physical properties were obtained. Surface tension: 27.4 mN/m (25° C.) Viscosity: 5 mPa's (25° C.) Contact angle: 40.0 degree (to polymethylpentene; 25° C.)

Example 3

A marking pen shown in FIG. 1 and FIG. 5 (c) was prepared.

Polypropylene (J229E, manufactured by Mitsui Chemicals Inc.) was used and molded to obtain an ink tank part (holder) having an outer diameter of 10 mm, an inner diameter of 8 mm and a length of 80 mm.

The critical surface tension of polypropylene obtained by Zisman-plot was 29 mN/m (25° C.).

The ink tank part was charged with an ink having the following composition.

|  | (parts by weight) |
|---|---|
| Diethylene glycol monomethyl ether | 60 |
| Ketone resin (Hilac 110H, manufactured by Hitachi Chemical Co., Ltd.) | 10 |
| Dye (SBN Blue-701, manufactured by Hodogaya Chemical Co., Ltd.) | 5 |
| Diethylene glycol monoethyl ether | 20 |
| Propylene glycol monomethyl ether | 5 |

A blue ink thus obtained was charged into the ink tank to such an extent that the whole volume of the tank was filled by about 30%.

The following ink physical properties were obtained. Surface tension: 33.6 mN/m (25° C.) Viscosity: 7.8 mPa's (25° C.) Contact angle: 36 degree (to polypropylene; 25° C.)

Example 4

A marking pen shown in FIG. 1 and FIG. 5 (c) was prepared.

Polypropylene (J229E, manufactured by Mitsui Chemicals Inc.) was used and molded to obtain an ink tank part having an outer diameter of 10 mm, an inner diameter of 8 mm and a length of 80 mm.

The critical surface tension of polypropylene obtained by Zisman-plot was 29 mN/m (25° C.).

The ink tank part was charged with an ink having the following composition.

|  | (parts by weight) |
|---|---|
| Ethylene glycol monomethyl ether | 50 |
| Ketone resin (Hilac 110H, manufactured by Hitachi Chemical Co., Ltd.) | 15 |
| Dye (SBN Blue-701, manufactured by Hodogaya Chemical Co., Ltd.) | 5 |
| Ethylene glycol monophenyl ether | 20 |
| Propylene glycol monomethyl ether | 10 |

A blue ink thus obtained was charged into the ink tank to such an extent that the whole volume of the tank was filled by about 30%.

The following ink physical properties were obtained. Surface tension: 33 mN/m (25° C.) Viscosity: 7.2 mPa's (25° C.) Contact angle: 35 degree (to polypropylene; 25° C.)

Example 5

A marking pen shown in FIG. 1 was prepared.

Polyethylene (high density polyethylene, manufactured by Mitsui Chemicals Inc.) was used and molded to obtain an ink tank part having an outer diameter of 10 mm, an inner diameter of 8 mm and a length of 80 mm.

The critical surface tension of polyethylene obtained by Zisman-plot was 30 mN/m (25° C.).

The ink tank part was charged with an ink having the following composition.

|  | (parts by weight) |
|---|---|
| Diethylene glycol monomethyl ether | 50 |
| Ketone resin (Hilac 110H, manufactured by Hitachi Chemical Co., Ltd.) | 15 |
| Dye (SBN Blue-701, manufactured by Hodogaya Chemical Co., Ltd.) | 5 |
| Diethylene glycol monophenyl ether | 20 |
| Propylene glycol monomethyl ether | 10 |

A blue ink thus obtained was charged into the ink tank to such an extent that the whole volume of the tank was filled by about 30%.

The following ink physical properties were obtained. Surface tension: 33.7 mN/m (25° C.) Viscosity: 10.8 mPa's (25° C.) Contact angle: 37 degree (to polyethylene; 25° C.)

Comparative Example 1

The ink tank prepared in Example 3 was used for an ink tank part (refer to FIG. 1 and FIG. 5 (c)).

The critical surface tension of polypropylene obtained by Zisman-plot was about 29 mN/m (25° C.).

Used was the same ink as in Example 1 [surface tension: 25 mN/m (25° C.), viscosity: 5 mPa's (25° C.) and contact angle: 20.0 degree (to polypropylene; 25° C.)].

The writing instruments (samples) obtained in Examples 1 to 5 and Comparative Example 1 were used to evaluate visibility of an amount of the ink by the following method.

Evaluation method of visibility:

The visibility of the amount of the ink was evaluated by slightly shaking the respective samples charged with the inks upward and downward and then determining time consumed until the amount of the ink can visually be confirmed after the inks are repelled from the internal surfaces of the ink tanks. Accordingly, the shorter the time, the better the visibility.

The evaluation results thereof are shown in the following Table 1.

TABLE 1

Evaluation results of visibility

| | Time consumed until confirming ink amount after ink is repelled |
|---|---|
| Example 1 | 20 seconds or shorter |
| Example 2 | 10 seconds or shorter |
| Example 3 | 20 seconds or shorter |
| Example 4 | 20 seconds or shorter |
| Example 5 | 20 seconds or shorter |
| Comparative Example 1 | 300 seconds or longer |

As apparent from the results shown in table 1 described above, it has been found that the writing instruments prepared in Examples 1 to 5 which fall in the scope of the present invention are very excellent in visibility as compared with that prepare in Comparative Example 1 which falls outside the scope of the present invention.

To give specific considerations, in Example 1, the internal surface in contact with the ink in the ink tank part has a smaller critical surface tension ($\gamma_c$=23.3 mN/m; 25° C.) than a surface tension ($\gamma$=25 mN/m; 25° C.) of the ink, and the contact angle between the ink and the internal surface in contact with the ink in the ink tank part is 32.8° (>30°) at a temperature of 25° C. Similarly in Examples 2 to 5, the internal surfaces in contact with the inks in the ink tank parts have smaller critical surface tensions ($\gamma_c$=23.3, 29, 29 and 30 mN/m respectively; 25° C.) than surface tensions ($\gamma$=27.4, 33.6, 33 and 33.7 mN/m respectively; 25° C.) of the inks, and the contact angles between inks and the internal surfaces in contact with the inks in the ink tank parts are 40.0°, 36°, 35° and 37° (>30°) at a temperature of 25° C. Thus, it can be found that they are very excellent in a visibility.

In contrast with this, in Comparative Example 1, the internal surface in contact with the ink in the ink tank part has a larger critical surface tension ($\gamma_c$29 mN/m; 25° C.) than a surface tension ($\gamma$=25 mN/m; 25° C.) of the ink, and the contact angle between the ink and the internal surface in contact with the ink in the ink tank part is 20.0° (<30°) at a temperature of 25° C. Accordingly, it can be found that the sufficiently high visible effect can not be exhibited.

What is claimed is:

1. A free ink type writing instrument having an ink take part for storing an ink, wherein the whole or a part of an internal surface part in contact with the ink in the ink tank part has a smaller critical surface tension than a surface tension of the ink, and a contact angle between the ink and the whole or a part of the internal surface part in contact with the ink in the ink tank part is 30° or more at a temperature of 25° C.

2. The writing instrument as described in claim 1, wherein the whole of the member of the ink tank part or the whole or a part of the internal surface part of the ink tank part comprises polymethylpentene.

3. The writing instrument as described in claim 2, wherein the ink has a viscosity of 1000 mPa•s or less at a temperature of 25° C.

4. The writing instrument as described in claim 2, wherein a principle solvent of the ink comprises an organic solvent.

5. The writing instrument as described in claim 1 or 2, wherein the ink has a surface tension of 50 mN/m or less at a temperature of 25°, and a contact angle between the ink and the internal surface part in contact with the ink in the ink tank part is 30° to 90° at a temperature of 25° C.

6. The writing instrument as described in claim 2, wherein the ink has a viscosity of 1000 mPa•s or less at a temperature of 25° C.

7. The writing instrument as described in claim 5, wherein a principle solvent of the ink comprises an organic solvent.

8. The writing instrument as described in claim 2, wherein the ink has a viscosity of 1000 mPa•s or less at a temperature of 25° C.

9. The writing instrument as described in claim 8, wherein a principle solvent of the ink comprises an organic solvent.

10. The writing instrument as described in claim 1, wherein a principle solvent of the ink comprises an organic solvent.

11. A free ink type writing instrument having an ink tank part for storing an ink, wherein the whole or a part of an internal surface part in contact with the ink in the ink tank part has a smaller critical surface tension than a surface tension of the ink, and a contact angle between the ink and the whole or a part of the internal surface part in contact with the ink in the ink tank part is 30° or more at a temperature of 25° C., wherein the ink tank part is formed of a transparent material to permit observation of at least a portion of the ink in the ink tank part.

* * * * *